US007618668B2

(12) United States Patent
Gimelli et al.

(10) Patent No.: US 7,618,668 B2
(45) Date of Patent: Nov. 17, 2009

(54) HEAT TOLERANT FARINACEOUS-BASED FOOD PRODUCT

(75) Inventors: Kenneth Gimelli, Waldwick, NJ (US); Marc Joseph Glasser, Warren, NJ (US)

(73) Assignee: Unilever Bestfoods, North America Division of Conopco, Inc., Englewood Cliffs, NJ (US)

(*) Notice: Subject to any disclaimer, the term of this patent is extended or adjusted under 35 U.S.C. 154(b) by 1192 days.

(21) Appl. No.: 10/795,936

(22) Filed: Mar. 8, 2004

(65) Prior Publication Data
US 2005/0196507 A1 Sep. 8, 2005

(51) Int. Cl.
*A23L 1/16* (2006.01)
(52) U.S. Cl. .................. 426/557; 426/451; 426/456; 426/457; 426/496; 426/516; 426/517
(58) Field of Classification Search .......... 426/557, 426/451, 456, 457, 496, 516, 517
See application file for complete search history.

(56) References Cited

U.S. PATENT DOCUMENTS

| 4,590,084 A | 5/1986 | Miller et al. |
| 5,599,573 A | 2/1997 | Barnes |
| 6,022,575 A | 2/2000 | Lee et al. |
| 6,217,918 B1 * | 4/2001 | Oh et al. .................. 426/89 |

FOREIGN PATENT DOCUMENTS

EP 0350552 * 7/1988

OTHER PUBLICATIONS

Francis, Frederick J. (1999). Wiley Encyclopedia of Food Science and Technology (2nd Edition) vols. 1-4. John Wiley & Sons. ☐☐Online version available at:☐☐http://www.knovel.com/knovel2/Toc.jsp?BookID=681&VerticalID=0, p. 605.*

* cited by examiner

*Primary Examiner*—Lien T Tran
*Assistant Examiner*—Vera Stulii
(74) *Attorney, Agent, or Firm*—Ellen Plotkin

(57) ABSTRACT

This invention is directed to a farinaceous-based food product. The food product has a protein additive and a hydrophobic ester and it is dried in a manner to give a cross-section of the same a scanning electron microscopy image that visually displays substantially no protein fiber gaps or voids at about 2000 times magnification. The farinaceous-based food product is firm and not sticky after cooking.

9 Claims, 1 Drawing Sheet

HEAT TOLERANT FARINACEOUS-BASED FOOD PRODUCT

FIELD OF THE INVENTION

The present invention is directed to a farinaceous-based food product. More particularly, the present invention is directed to a farinaceous-based food product, like a pasta composition, that comprises a protein additive and a hydrophobic ester. The pasta composition of the present invention, unexpectedly, has an increased cooking tolerance and is firm with an excellent bite after cooking, whereby the same has a scanning electron microscopy image that visually displays substantially no protein fiber gaps or voids at about 2000 times magnification. Moreover, the pasta composition of this invention has excellent taste and color characteristics and is not sticky subsequent to being cooked.

BACKGROUND OF THE INVENTION

In our modern and hectic world, ready-to-eat meals are highly desired. While, for example, ready to eat meals comprising farinaceous-based food products exist, it is very difficult to find such meals with the quality (e.g., taste, color and texture) of home cooked meals. Particularly, conventional pasta compositions found in ready-to-eat meals are often over-cooked, thereby displaying soft, sticky and mush-like characteristics. Such conventional pasta compositions are over-cooked since they are usually cooked or hydrated and retorted or pasteurized prior to being packaged. After being packaged, the consumer is instructed to reheat the same prior to serving, resulting in an undesirable pasty food product that has been heated numerous times.

There is increasing interest to develop a farinaceous-based food product that is firm with a nice bite (al dente) after cooking, and especially, after being retorted and reheated. This invention, therefore, is directed to a farinaceous-based food product, like a pasta composition, comprising a protein additive and a hydrophobic ester. The farinaceous-based food product of this invention, unexpectedly, has excellent taste, texture and color characteristics and is not sticky, even after being retorted and reheated.

Additional Information

Efforts have been described for making pasta compositions. In U.S. Pat. No. 4,590,084, retorted pasta products containing high amylose starch are described.

Other efforts have been disclosed for making pasta compositions. In U.S. Pat. No. 5,599,573, acidified pastas suitable for packaging are described.

Still other efforts for making pasta compositions have been disclosed. In U.S. Pat. No. 6,022,575, pasta with improved retrogration tendencies is described.

None of the additional information above describes a farinaceous-based food product with superior taste, texture and color characteristics, even after being retorted and reheated. Particularly, none of the additional information above describes a farinaceous-based food product having a scanning election microscopy image that visually displays substantially no protein fiber gaps or voids at about 2000 times magnification.

SUMMARY OF THE INVENTION

In a first aspect, the present invention is direct to a farinaceous-based food product comprising:
a) a protein additive; and
b) a hydrophobic ester
wherein the farinaceous-based food product has a scanning election microscopy image that visually displays substantially no protein fiber gaps or voids at about 2000 times magnification.

In a second aspect, the invention is directed to a method for making the farinaceous-based food product of the first aspect of this invention.

In a third aspect, the present invention is directed to a meal comprising the farinaceous-based food product of the first aspect of this invention.

Farinaceouos-based, as used herein, means comprising starch. Scanning electron microscopy image that that displays substantially no protein fiber gaps or voids at about 2000 times magnification means an image taken on a hydrated (e.g., in water at ambient temperature for about 12 to 16 hours) food product sample with a scanning electron microscope whereby the image displays (to the naked eye) substantially no gaps or voids (e.g., holes) within the protein fiber network distributed between starch granules, the image taken of a fully hydrated product in a scanning electron microscope, with time being about 2.5 hours, vacuum pressure being about 0.12 millibar, and sample temperature being about −65.0° C. Protein additive is defined to mean a protein that can coagulate and is supplied in addition to gluten supplied with flour. Hydrophobic ester means having a hydrophilic/lipophilic balance of under about 13 and at least one ester linkage where ester linkage is meant to include a hetero group like a phospho group. Reduced-carbohydrate means a farinaceous-based food product with less than 100% durum semolina. Weight percent, as used herein, means as extruded and prior to drying in, for example, an oven. Relative humidity (of a water-air mixture) means 100 times the partial pressure of water divided by the saturation vapor pressure of water at the same temperature. Firm with an excellent bite after cooking means the farinaceous-based food product of this invention has a firmness of at least four times that of conventionally made pasta of an identical shape and after 30 minutes of cooking, with firmness being a force measurement taken on a Texture Technologies TA-XT2i texture analyzer employing a 1 mm blade.

BRIEF DESCRIPTION OF THE DRAWINGS

The subject matter regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

Figure 1:
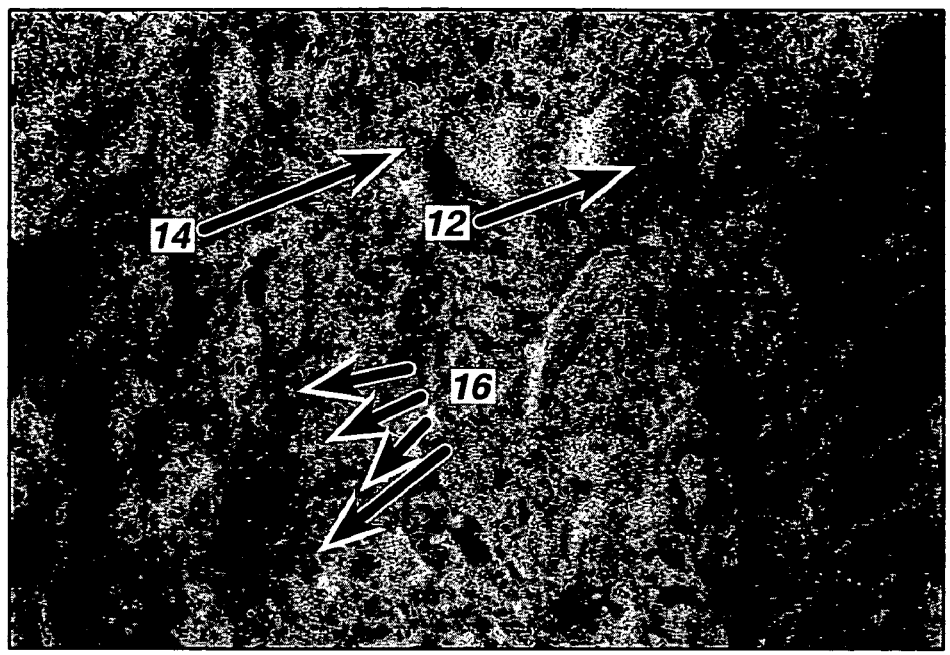
FIG. 1 is a scanning electron microscopy image of the farinaceous-based food product made by the process of this invention.

There is no limitation with respect to the type of food product the farinaceous-based food product of this invention is, other than that it is one suitable to comprise gluten. Typically, the farinaceous-based food product of this invention is one which can be cooked in boiling water. Illustrative non-limiting examples of such food product includes spaetzle, pierogi and dumplings as well as traditional pasta compositions like shells, bows, penne, rotelle, spaghetti, noodles, ditalini, mostaccioli, rigatoni, ziti, ravioli and tortellini.

The flour suitable for use to make the farinaceous-based food product of this invention may be, for example, bean, barley, oat, potato, soy, durum semolina, buckwheat, rice, kamut, corn, rye, spelt, bleached, unbleached, whole wheat, yam, gluten flour or mixtures thereof, with the proviso that at least about 50.0%, and preferably, at least about 60.0%, and most preferably, from about 65.0% to about 100.0% by weight of the flour employed comprises gluten protein (i.e., prolamines and glutelins). In an especially preferred embodiment, the farinaceous-based food product of this invention comprises 100.0% durum semolina as the flour source.

Typically, the farinaceous-based food product of this invention comprises from about 65.0% to about 95.0%, and preferably, from about 70.0% to about 90.0%, and most preferably, from about 75.0% to about 87.0% by weight flour, based on total weight of the farinaceous-based food product and including all ranges subsumed therein.

The protein additive used in this invention is one that is suitable for human consumption. Often, the protein additive is an egg-based material such as dried or liquid egg white, dried or liquid whole egg, or a mixture thereof. Such a protein additive can also be gluten or a component thereof like gliaden, or an additive with giladen or glutenin or an additive with glutenin in addition to the gluten supplied with flour. In an especially preferred embodiment, the protein additive is dried or liquid egg white, and most preferably, dried egg white solids.

The amount of protein additive used is limited only to the extent that the resulting farinaceous-based food product can produce a scanning electron microscopy image as described herein. Typically, the amount of protein additive employed (in dry form) is from about 1.0 to about 15.0% by weight, based on total weight of the farinaceous-based food product and including all range subsumed therein.

In a preferred embodiment, the amount of protein additive employed is from about 1.0 to about 10.0%, and most preferably, from about 2.0 to about 8.0% by weight based on total weight of the farinaceous-based food product and including all ranges subsumed therein.

The hydrophobic ester suitable for use in this invention is one which can be used in a food product. Typically, the hydrophobic ester is one which reduces the stickiness of the farinaceous-based food product, after the food product is cooked. Such a hydrophobic ester can also enhance the integrity of the cooked farinaceous-based food product, whereby the food product, after cooking or reheating, remains firm with an excellent bite.

Illustrative examples of the hydrophobic esters which may be used in this invention include mono- and di-acylglycerides, sorbitan esters, sucrose esters, lecithin or mixtures thereof. Preferred sorbitan esters are sorbitan monostearate and sorbitan monolaurate. Preferred mono- and di-acylglycerides are glycerol monostearate and glycerol distearate. In a most preferred embodiment, the hydrophobic ester used in the farinaceous-based food product of this invention is glycerol monostearate.

Typically, the amount of hydrophobic ester employed in the farinaceous-based food product of this invention is from about 0.25% to 2.5%, and preferably, from about 0.5% to about 2.0%, and most preferably, from about 0.75% to about 1.0% by weight, based on total weight of the farinaceous-based food product and including all ranges subsumed therein.

It is within the scope of this invention to employ optional additives, such as artificial and/or natural flavors, with the farinaceous-based food products of this invention. Such flavors include butter flavors, cheese flavors, fruit flavors and/or vegetable flavors. It is also within the scope of this to optionally employ, with or in lieu of flavors, food-based additives like tomato, spinach, artichoke, pepper and/or eggplant powder, particulate or both powder and particulate.

Still other optional additives suitable for use in the farinaceous-based food product of this invention include spices (like salt, curry, dill and ground fennel), vitamins (like vitamin C, and B-vitamins) as well as food grade acidulants (like malic, lactic, citric and acetic acid). Typically, the optional additives, collectively, make up less than about 6.0% by weight of the total weight of the farinaceous-based food product. The balance of the farinaceous-based food product is water, whereby water often makes up from about 25.0% to about 35.0%, and preferably, from about 28.0% to 32.0% by weight of undried farinaceous-based food product (prior to drying, e.g., as an extruded mixture), including all ranges subsumed therein.

When making the farinaceous-based food product of this invention, the ingredients (i.e., flour, protein additive and hydrophobic ester) are combined and mixed with water to produce a homogeneous mixture. The homogeneous mixture is, preferably, extruded (at a temperature from about 28° C. to about 60° C.) and formed into any desired shape to produce an extruded mixture. Conventional extruders, like those made by DeMaco, Mapimpianti, Brabender or Braibant, may be employed and such extruders should have an orifice pressure from about 1700 psi to about 2800 psi.

The extruded mixture, after being formed, is subsequently dried in, for example, an oven, and preferably, in two phases. The first drying phase is at least about 10 minutes, and preferably, not longer than about 1.0 hour. The second drying phase is at least about 3.0 hours, and preferably, not longer than about 8.0 hours. The drying temperature is typically from about 68° C. to about 150° C., and preferably, from about 70° C. to about 95° C. (including all ranges subsumed therein) at a relative humidity from about 40.0% to about 80.0%, and preferably, from about 50.0% to about 75.0%, with the proviso that the drying temperature and relative humidity for the second drying phase are each, independently, preferably at least about 3.0%, and most preferably, less than about 40.0% more than the drying temperature and relative humidity for the first drying phase. Subsequent to drying, the resulting heated extruded mixture is the superior farinaceous-based food product of this invention, having from about 4.0% to about 18.0%, and preferably, from about 13.0% to about 16.0% by weight water or moisture, based on total weight of the farinaceous-based food product and including all ranges subsumed therein.

There is no limitation with respect to the end uses of the farinaceous-based food product of this invention. Typically, however, the same is used in ready to eat meal kits that have been optionally retorted or pasteurized. Such meal kits are usually suitable for boiling in water and/or microwave heating and they preferably comprise a white, red, or cheese sauce made commercially available by Unilever Bestfoods under the Ragu or Bertolli brand name.

Turning to the figures, FIG. 1 shows a scanning electron micrograph 10 of a fully hydrated pasta sample made according to the processing steps of this invention and comprising protein additive and hydrophobic ester. Starch granules 12 are shown homogeneously dispersed throughout the pasta network as are protein fibers 14 whereby the protein fibers display substantially no voids.

Figure 2:
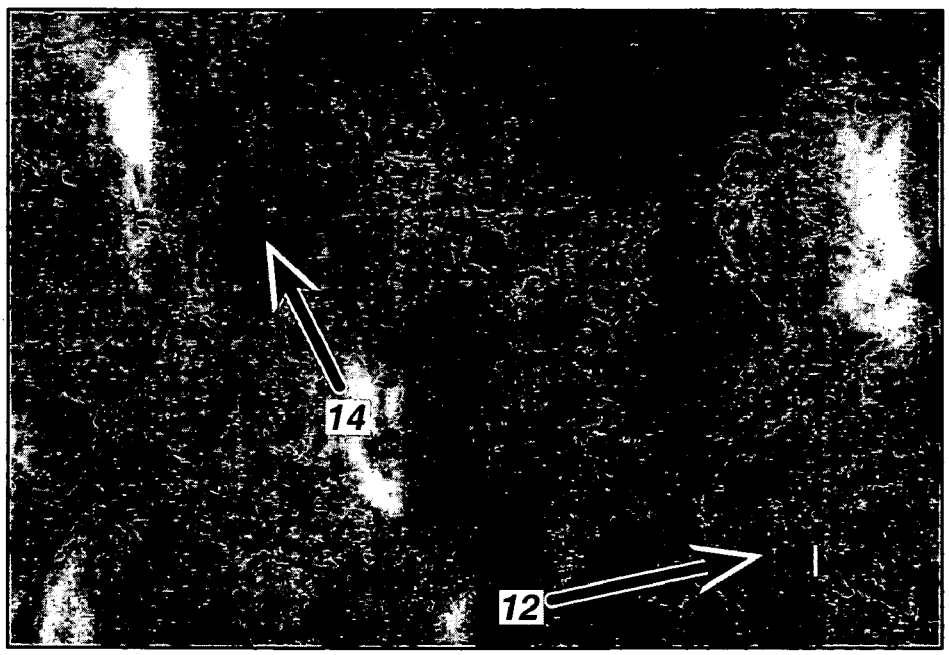
FIG. 2 is a scanning electron microscopy image of a farinaceous-based food product not made by the process of this invention.

FIG. 2 shows a scanning electron micrograph 10a of a fully hydrated pasta sample (same formula as the pasta sample in FIG. 1) not made according to the processing steps of this invention (i.e., dried in an oven for about 5.5 hours at 63.0° C.). Starch granules 12a are within protein fibers 14a which contain an abundance of voids 16a.

The micrographs of FIGS. 1 and 2 show that farinaceous-based food products made according to the processing steps of this invention have substantially no visual protein fiber gaps or voids thereby unexpectedly producing a food product having a very desired firm bite after cooking.

The following examples are provided to facilitate an understanding of the present invention. The Examples are not meant to limit the scope of the claims.

EXAMPLE 1

The following ingredients were mixed in a mixing vessel and stirred under moderate shear:

| Ingredient | Weight Percent |
| --- | --- |
| Dry Egg White | 4.00% |
| Glycerol Monostearate | 1.00% |
| Durum Semolina Flour | 81.72% |
| Water | Balance |

The ingredients were thoroughly mixed and extruded in a Brabender Extruder (at about 40° C., 2000 psi) to produce a penne shaped extruded mixture. The penne shaped extruded mixture (about 32.0% moisture) was dried in a first phase in an oven at about 77.0° C. for about 30 minutes, relative humidity about 55.0%. The resulting partially extruded mixture was then dried in a second phase in an oven at about 80.0° C. for about 5.5 hours, relative humidity about 70.0%. The resulting dried product is the farinaceous-based food product of this invention. Product was cooked in boiling water for about 15 minutes and drained, and a cross section of the same ($1.3 \times 10^{-3}$ cm thick and fully hydrated) was assessed in a CamScan USA Scanning Electron Microscope.

The resulting image revealed a pasta product with a substantially void free protein fiber network as shown in FIG. 1. The food product was visually assessed and tasted, and surprisingly, had good color, was not sticky and had an excellent bite after being cooked.

EXAMPLE 2

The farinaceous-based food product of Example 2 was made in a manner similar to the one described in Example 1 except that the penne shaped extruded mixture was dried in an oven at about 63.0° C. for about 5.5 hours, relative humidity of about 35.0%. A cross-section of the resulting dried farinaceous-based food product ($1.3 \times 10^{-3}$ thickness) fully hydrated (i.e., after being cooked in boiling water for about 15 minutes and drained) was assessed in a CamScam USA scanning electron microscope. The resulting image revealed a pasta network that did comprise voids as shown in FIG. 2. Moreover, after being visually assessed and tasted, the cooked product appeared very soft and mush-like and was very sticky.

What is claimed is:

1. A farinaceous-based food product comprising
   (a) about 1.0% to about 15.0% by weight of a protein additive;
   (b) about 0.25% to about 2.5% by weight of a hydrophobic ester; and
   (c) about 65.0% to about 95.0% by weight of a flour mixture with at least about 50.0% by weight of the flour mixture comprising gluten protein;
   (d) about 4.0% to about 18.0% by weight water;
   wherein the farinaceous-based food product has a scanning electron microscopy image that visually displays substantially no protein fiber gaps or voids at about 2000 times magnification.

2. The farinaceous-based food product according to claim 1 wherein the protein additive is dried or liquid egg white, dried or liquid whole egg, gliaden or a mixture thereof.

3. The farinaceous-based food product according to claim 1 wherein the hydrophobic ester has an HLB of under about 13.

4. The farinaceous-based food product according to claim 3 wherein the hydrophobic ester is mono- or di-acylglyceride, sorbitan ester, sucrose ester, lecithin, or mixture thereof.

5. The farinaceous-based food product according to claim 1 wherein the microscopy image further comprises starch granules homogeneously dispersed therein.

6. The farinaceous-based food product according to claim 1 wherein the food product, at the time of extrusion and as an extruded mixture, comprises from about 25.0% to about 35.0% by weight water.

7. The farinaceous-based food product according to claim 1 wherein the food product comprises flavors, or tomato, spinach, artichoke, pepper, or eggplant powder or particulate, vitamin, spices, acidulant or a mixture thereof.

8. A meal kit comprising the farinaceous-based food product of claim 1.

9. The meal kit according to claim 8 wherein the meal kit can be heated in boiling water or a microwave oven.

* * * * *